(12) United States Patent
Struik

(10) Patent No.: US 9,043,876 B2
(45) Date of Patent: May 26, 2015

(54) CRYPTOGRAPHIC METHOD AND APPARATUS

(71) Applicant: Certicom Corp., Mississauga (CA)

(72) Inventor: Marinus Struik, Toronto (CA)

(73) Assignee: Certicom Corp., Mississauga, Ontario (CA)

( * ) Notice: Subject to any disclaimer, the term of this patent is extended or adjusted under 35 U.S.C. 154(b) by 0 days.

(21) Appl. No.: 14/199,421

(22) Filed: Mar. 6, 2014

(65) Prior Publication Data

US 2014/0282873 A1    Sep. 18, 2014

Related U.S. Application Data

(63) Continuation of application No. 13/275,027, filed on Oct. 17, 2011, now Pat. No. 8,707,036, which is a continuation of application No. 10/986,806, filed on Nov. 15, 2004, now Pat. No. 8,060,743.

(60) Provisional application No. 60/519,609, filed on Nov. 14, 2003.

(30) Foreign Application Priority Data

Nov. 14, 2003    (CA)    ...................................... 2449524

(51) Int. Cl.
*G06F 21/00*    (2013.01)
*H04L 29/06*    (2006.01)
*H04L 9/00*    (2006.01)

(52) U.S. Cl.
CPC . *H04L 63/08* (2013.01); *H04L 9/00* (2013.01)

(58) Field of Classification Search
USPC .......................................................... 726/3
See application file for complete search history.

(56) References Cited

U.S. PATENT DOCUMENTS

| | | | | |
|---|---|---|---|---|
| 6,092,191 A * | 7/2000 | Shimbo et al. | ................ | 713/153 |
| 6,915,426 B1 * | 7/2005 | Carman et al. | ................ | 713/168 |
| 6,986,046 B1 * | 1/2006 | Tuvell et al. | .................. | 713/171 |
| 7,233,664 B2 * | 6/2007 | Soliman | .......................... | 380/44 |
| 7,539,866 B2 | 5/2009 | Kang et al. | | |
| 7,657,757 B2 * | 2/2010 | Feldman | ....................... | 713/191 |
| 7,715,553 B2 * | 5/2010 | Smith et al. | ..................... | 380/29 |
| 8,060,743 B2 * | 11/2011 | Struik | ........................... | 713/160 |
| 2002/0083317 A1 * | 6/2002 | Ohta et al. | ..................... | 713/161 |
| 2002/0188871 A1 * | 12/2002 | Noehring et al. | ............. | 713/201 |
| 2003/0033375 A1 * | 2/2003 | Mitreuter et al. | ............. | 709/217 |
| 2003/0145198 A1 * | 7/2003 | Sakaguchi | ..................... | 713/160 |
| 2004/0073796 A1 * | 4/2004 | Kang et al. | .................... | 713/171 |
| 2004/0146158 A1 * | 7/2004 | Park | ............................... | 380/37 |
| 2005/0097315 A1 * | 5/2005 | Carmeli | ........................ | 713/160 |

OTHER PUBLICATIONS

Rogaway, Phillip, and David Wagner. "A Critique of CCM." IACR Cryptology ePrint Archive 2003: 70.*

(Continued)

*Primary Examiner* — Harris Wang
(74) *Attorney, Agent, or Firm* — Fish & Richardson P.C.

(57) ABSTRACT

A method of formatting data for transmission to another party including the step of incorporating in the data a flag indicative of the absence of data for authentication of the sender. An authentication tag length is also included to permit variable length tags to be used.

19 Claims, 5 Drawing Sheets

(56) References Cited

OTHER PUBLICATIONS

Karlof, Chris, Naveen Sastry, and David Wagner. "TinySec: a link layer security architecture for wireless sensor networks." Proceedings of the 2nd international conference on Embedded networked sensor systems. ACM, 2004.*

A unified, configurable architecture implementing block cipher operational modes, Communications Technology, 2005. Enabling Technologies for the New Knowledge Society: ITI 3rd International Conference on, Issue Date: Dec. 5-6, 2005, Written by: Fayed, M.; Watheq El-Kharashi, M.; Khan, E.; Gebali, F.*

Adekunle et al.; "Zone Based Systems Design Framework for the Realisation of Efficient Block Cipher Based Message Authentication Code Algorithms"; 2010 International Conference on Availability, Reliability and Security.

ANSI X9, 63-2001, Public Key Cryptography for the Financial Services Industry—Key Agreement and Key Transport Using Elliptic Curve Cryptography, American Bankers Association, Nov. 20, 2001., 415 pp.

Dworkin, Morris; "Recommendation for Block Cipher Modes of Operation—Methods and Techniques"; NIST Special Publication 800-38A, 2001 Edition; US Department of Commerce/N.I.S.T.; Dec. 2001; available from http://csrc.nist.gov.

Dworkin, Morris; Draft "Recommendation for Block Cipher Modes of Operation—The CCM Mode for Authentication and Confidentiality"; NIST Special Publication 800-38C; US Department of Commerce/N.I.S.T; Springfield, Virginia; Sep. 4, 2003; available from http://crsc.nist.gov.

FIPS Pub 113, Computer Data Authentication, Federal Information Processing Standards Publication 113, US Department of Commerce/N.I.S.T., May 30, 1985, 6 pp.

FIPS Pub 197, Advanced Encryption Standard (AES), Federal Information Processing Standards Publication 197, US Department of Commerce/N.I.S.T. Springfield, Virginia, Nov. 26, 2001, 51 pp.

Housley, R. et al; "Counter with CBC-MAC (CCM)"; submission to N.I.S.T; Jun. 3, 2002; available from http://csrc.nist.gov/encryption/modes/proposedmodes.

Institute of Electrical and Electronics Engineers, Inc., IEEE Std. 802.11-1999, IEEE Standard for Telecommunications and Information Exchange Between Systems—LAN/MAN Specific Requirements—Part 11: Wireless Medium Access Control (MAC) and Physical Layer (PHY) Specifications, New York: IEEE Press, 1999, 526 pp.

Institute of Electrical and Electronics Engineers (IEEE); "IEEE Std. 802.15.3-2003, IEEE Standard for Information Technology—Telecommunications and Information Exchange between Systems—Local and Metropolitan Area Networks—Specific Requirements—Part 15.3: Wireless Medium Access Control (MAC) and Physical Layer (PHY) Specifications for High Rate Wireless Personal Area Networks (WPAN)"; Clause 10.4; pp. 236-242; New York: IEEE Press; 2003.

Institute of Electrical and Electronics Engineers (IEEE); IEEE Std. 802.15.4-2003, IEEE Standard for Information Technology—Telecommunications and Information Exchange between Systems—Local and Metropolitan Area Networks—Specific Requirements—Part 15.4: Wireless Medium Access Control (MAC) and Physical Layer (PHY) Specifications for Low Rate Wireless Personal Area Networks (WPAN); Appendix B.1; pp. 191-195; New York: IEEE Press; 2003.

Jonsson, J.; "On the Security of CTR+CBC-MAC"; Proceedings of Selected Areas of Cryptography—SAC 2002; K. Nyberg, H. Heys, Eds.; Lecture Notes in Computer Science, vol. 2595; pp. 76-93; Berlin: Springer; 2002.

Jonsson, J.; "On the Security of CTR+CBC-MAC, NIST Mode of Operation—Additional CCM Documentation"; 2002; available from http://csrc.nist.gov/encryption/modes/proposedmodes.

Rogaway, P. et al.; "A Critique of CCM"; IACR ePrint Archive 2003-070; Apr. 13, 2003.

Struik, R.; "02469r0P802-15_TG4-Draft-D17-Annex-B-Security-Recommendation-for-IEEE-802.15.4-Low-Rate-WPAN"; IEEE submission; Nov. 19, 2002; available from http://grouper.ieee.org/groups/802/15/pub/2002/Nov02.

Struik, R.; "02474r1P802-15_TG4-Security-and-Security-Architectural-Recommedations-for-the-IEEE-802.15.4-Low-Rate-WPAN"; IEEE submission; Nov. 19, 2002; available from http://grouper.ieee.org/groups/802/15/pub/2002/Nov02.

Struik, R.; "Comments on NIST Draft Pub 800-38C: CCM Mode of Operation"; Oct. 20, 2003; available from http://csrc.nist.gov/CryptoToolkit/modes/Recommendation.

Office Action issued in Canadian Application No. 2,449,524 on Apr. 11, 2012; 3 pages.

Notice of Allowance issued in Canadian Application No. 2,449,524 on Jan. 14, 2013; 1 page.

Comments NIST Draft Pub. 800-38C; Rene Struik; Oct. 20, 2003; 15 pages.

* cited by examiner

| | 8 Bytes | 4 Bytes | 1 Bytes |
|---|---|---|---|
| | Source Address A | Frame Counter A | Protection Level SEC |
| | Nonce N | | |

FIG. 6

| Protection Level SEC | Encryption ON/OFF | Authentication Length M |
|---|---|---|
| 0x00 | OFF | 0 Bytes (M=0) |
| 0x01 | OFF | 4 Bytes (M=4) |
| 0x02 | OFF | 8 Bytes (M=8) |
| 0x03 | OFF | 16 Bytes (M=16) |
| 0x04 | ON | 0 Bytes (M=0) |
| 0x05 | ON | 4 Bytes (M=4) |
| 0x06 | ON | 8 Bytes (M=8) |
| 0x07 | ON | 16 Bytes (M=16) |

FIG. 7

| Octet no: | 0 | 1 ... 14-L | 15-L | 16-L ... 15 |
|---|---|---|---|---|
| Contents: | Flags | Nonce N | SecField | $l(m)$ |

FIG. 8

| Bit no: | 0 | 1 | 2 | 3 | 4 | 5 | 6 | 7 |
|---|---|---|---|---|---|---|---|---|
| Contents: | L | | | M | | | Adata | Reserved |

FIG. 9

| Octet no: | 0 | 1 ... 14-L | 15-L | 16-L ... 15 |
|---|---|---|---|---|
| Contents: | Flags | Nonce N | SecField | Counter i |

FIG. 10

| Bit no: | 0 | 1 | 2 | 3 | 4 | 5 | 6 | 7 |
|---|---|---|---|---|---|---|---|---|
| Contents: | L | | | 0 | | | Reserved | Reserved |

FIG. 11

CRYPTOGRAPHIC METHOD AND APPARATUS

This application is a continuation of prior U.S. patent application Ser. No. 13/275,027, entitled "Cryptographic Method and Apparatus," filed on Oct. 17, 2011, which is a continuation of prior U.S. patent application Ser. No. 10/986,806, entitled "Cryptographic Method and Apparatus," filed on Nov. 15, 2004, and issued as U.S. Pat. No. 8,060,743 on Nov. 15, 2011, which claims the benefit of U.S. Provisional Application No. 60/519,609 filed on Nov. 14, 2003 and Canadian Application No. 2,449,524 filed on Nov. 14, 2003. The entire contents of all four priority applications are hereby incorporated by reference in the present application.

FIELD OF THE INVENTION

The present invention relates to cryptographic methods and apparatus.

DESCRIPTION OF THE PRIOR ART

A block cipher is a versatile cryptographic function that has found widespread adoption in cryptographic schemes. It may be used as a central component in a cryptographic system and permits message authentication techniques and entity authentication techniques to be included.

CCM is a block-cipher mode of operation that can be used to protect the privacy and/or authenticity of messages. The CCM mode is a particular mode of operation that operates on block-ciphers, typically with a 128-bit block size, and involves a particular combination of the so-called Counter (CTR) mode of operation and the Cipher-Block Chaining (CBC) mode of operation, using a single key. The CCM mode of operation has been widely adopted, due to its incorporation as the mandatory block-cipher mode of operation in a number if current wireless standards that recently emerged, including the IEEE 802.11 WLAN standard and the IEEE 802.15 High-Rate and Low-Rate WPAN standards.

The CCM mode allows for variable-length authentication tags (from 32-bits to 128-bits), thus allowing varying degrees of protection against unauthorized modifications. The CCM mode allows quite efficient implementations, due to the fact that one only needs to implement the encryption transformation of the underlying block-cipher (and not the decryption transformation) and due to its reliance on a single key, rather than multiple keys, to provide confidentiality and authenticity services. This being said, the CCM mode has also some disadvantages.

SUMMARY OF THE INVENTION

While the original CCM mode provides for data authentication and, possibly, confidentiality, it does not provide for confidentiality only. This is unfortunate, since not all implementation environments call for data authenticity (e.g., if data authenticity is provided by an external mechanism).

The original CCM mode is known to be vulnerable to specific attacks, if used with variable-length authentication tags rather than with fixed-length authentication tags only. Thus, the original CCM can only be securely used with the same key in settings with fixed-length authentication tags. This is unfortunate, since support for variable-length authentication tags is useful in constrained implementation environments, such as secured wireless sensor networks, where applications on a device might have different protection requirements, but would have to share the same key, due to resource constraints.

It is therefore an object of the present invention to obviate or mitigate the above disadvantages.

A method of formatting data for transmission to another party including the step of incorporating in the data a flag indicative of the absence of data for authentication of the sender.

BRIEF DESCRIPTION OF THE DRAWINGS

The features of the invention will become more apparent in the following detailed description in which reference is made to the appended drawings wherein:

FIG. 6 is an expanded representation of a portion of data used in the enciphering process.

FIG. 7 is a table indicating the coding of data to be incorporated in the data shown in FIG. 5.

FIG. 8 is a representation of data used in the initiation of the enciphering process.

FIG. 9 is an expanded portion of data shown in FIG. 8.

FIG. 10 represents the format of data used in the enciphering process.

FIG. 11 is an enlarged view of a portion of the data shown in FIG. 10.

DETAILED DESCRIPTION OF THE INVENTION

Figure 1:
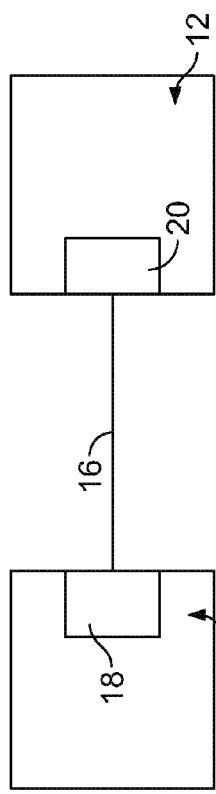
FIG. 1 is a schematic illustration of a data communication system.

Referring therefore to FIG. 1, a pair of correspondents 10, 12 communicate over a transmission link 16. Each of the correspondents 10, 12 includes a cryptographic engine 18, 20 respectively that may receive information from the correspondent and perform cryptographic operations on it before transmission over the transmission line 16. Similarly, messages received over the transmission line 16 may be processed by the cryptographic unit 18, 20 to provide information to the recipient.

Although it will be appreciated that the cryptographic units 18, 20 are similar and that each can function with its respective correspondent as a recipient or a sender, it will be assumed for the purpose of the following description that the correspondent 10 is the sender of a message and that its cryptographic unit 18 acts to encode the information for transmission and that the correspondent 12 is the recipient of the information and the cryptographic unit 20 acts to process information that is received.

Figure 2:
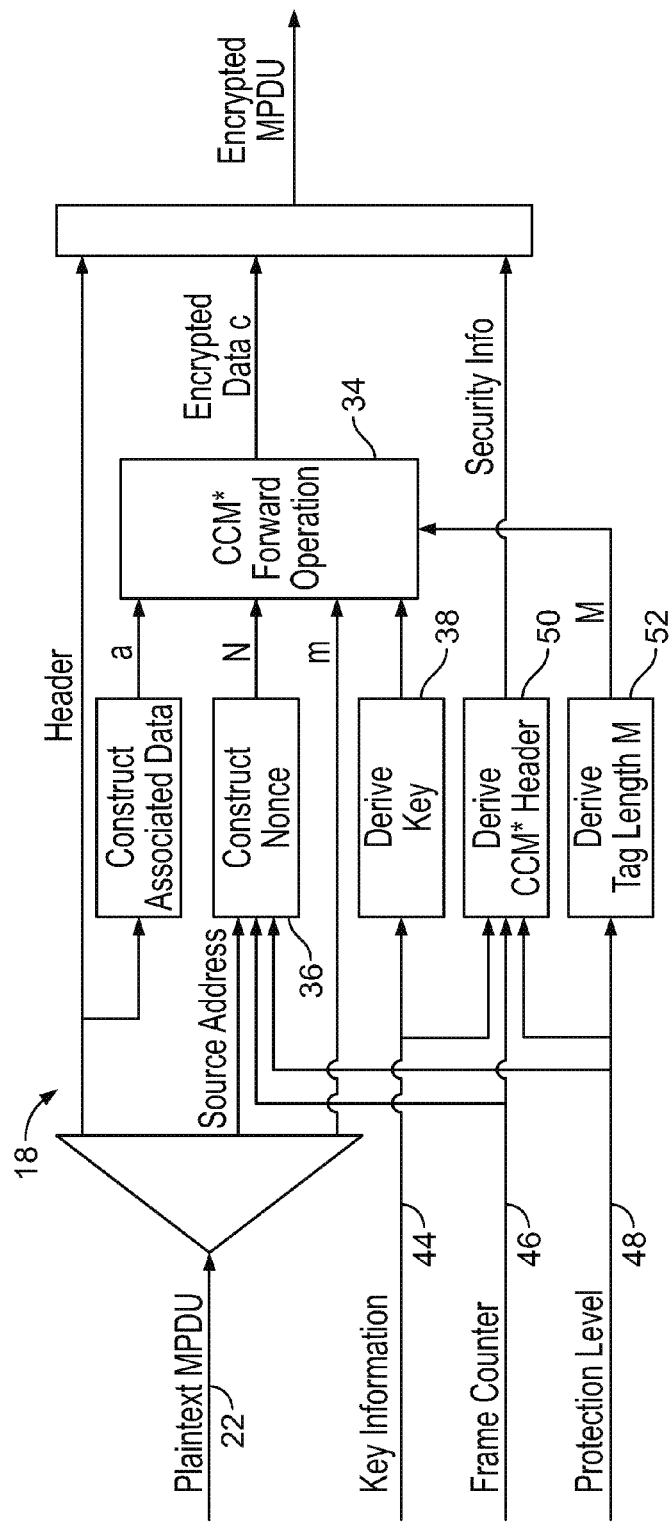
FIG. 2 is a representation of a cryptographic engine as used by one of the correspondents in FIG. 1.
Figure 4:
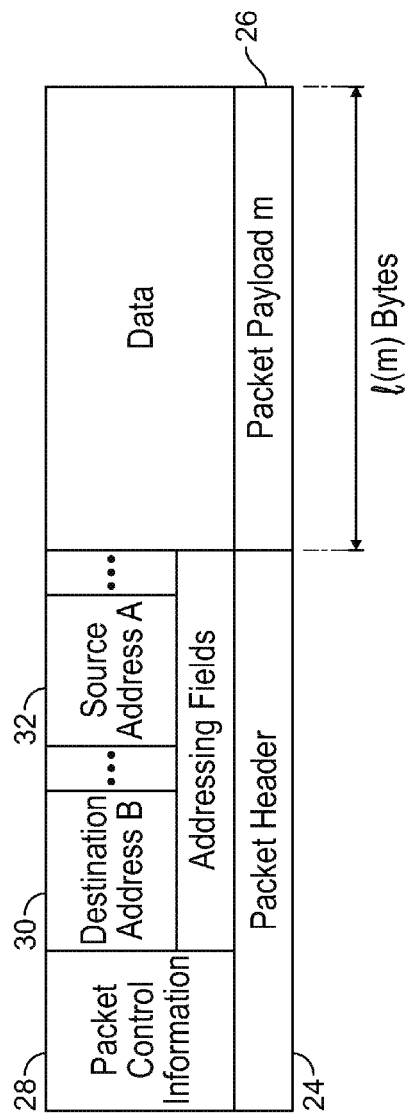
FIG. 4 is a representation of the format of data presented to the cryptographic engine of FIG. 2.

Referring therefore to FIG. 2, cryptographic unit 18 includes an input 22 of a message to be forwarded to the recipient 12. The format of the message may be seen in FIG. 4 and includes a packet header 24 and a payload 26 consisting of the message m. The packet header 24 has packet control information 28 and a plurality of addressing fields including the destination address 30, in this case, the destination of the correspondent 12, and the source address 32, in this case the address of the correspondent 10. The header 24 is to be transmitted over the link 116 as plain text whereas the payload 26 is to be transmitted in a secure manner.

The enciphering of the message m is performed by an encryption module 34 that may implement a suitable encryption algorithm. In the present example, a block cipher mode of operation is performed preferably implementing a block cipher mode compatible with CCM. The encryption module 34 requires as inputs a nonce 36 and a key 38. As a further input, selected information, a, contained in the header may be forwarded to the encryption module 34 to provide a degree of authentication. The output from the encryption module 34 is encrypted data 'c.'

In order to derive a key at input 38, key information is supplied over line 44 permitting to a key to be derived from for example the addressing information of the sending party and the recipient or by other previously agreed upon means.

In order to provide a unique value to the nonce 36, a frame counter 46 is provided and is not permitted to be reused within the context of utilising the same key input.

An input signal indicating the desired protection level is also provided at 48 and is used to indicate whether confidentiality is required and whether authenticity is required and at what level. The encoding of the input signal 48 is shown in FIG. 7 and provides an unambiguous indication of the nature of the security level required. As seen in FIG. 7, the protection level SEC provides eight possible options, as represented by the Lexa-decimal codes. This enables lower most bits of the code to represent uniquely and unambiguously the different combination. Moreover, the combinations are ordered so that those with a 1xx indicate the encryption is turned on and those 0xx have the encryption turned off to further facilitate recognition of the cooling.

The key information 44, frame counter 46 and protection level 48 are provided to a buffer 50 where they are concatenated to provide a security information output.

The protection level of signal 48 is also fed to a encoding module 52 that determines the authentication tag length and provides an input signal M indicating the length of the authentication tag to be appended to the message and included in the ciphertext 'c'. Again, as may be seen from FIG. 7, each of the possible tag lengths, in this case 0, 4, 8 or 16 bytes, is provided with a corresponding M value that may be represented as a combination of three bits, The values are provided to the encryption module 34 for inclusion in the data string to enciphered. A greater range of values may be used with additional bits provided in the field as appropriate.

Figure 5:
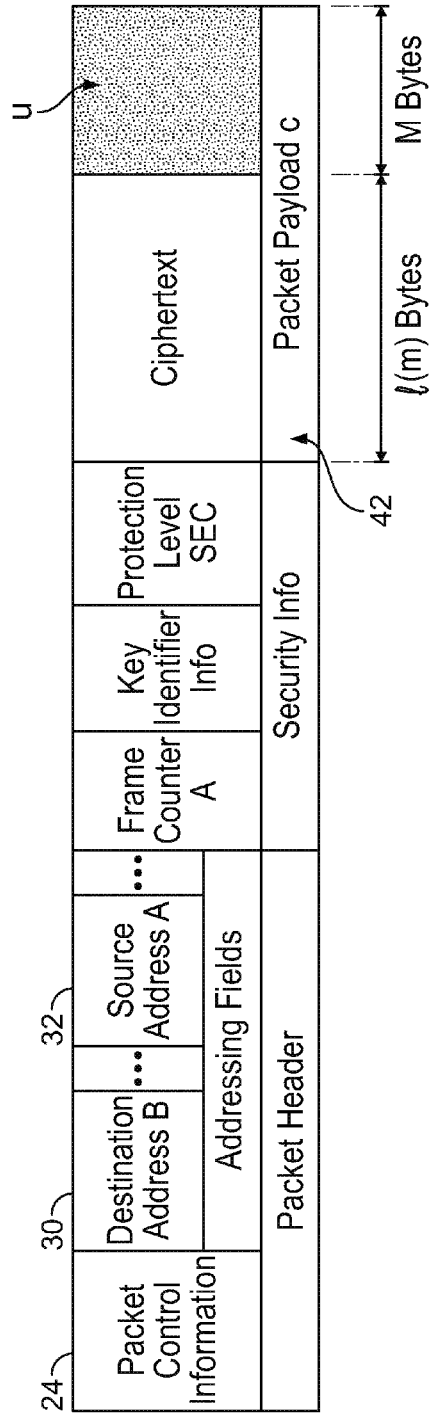
FIG. 5 is a representation of the format of data generated by the cryptographic engine of FIG. 2.

The outputs of the header, encrypted data 42 and security information from the buffer 50 are assembled at a database 54 and transmitted over the communication line 16. The format of the resultant transmission may be seen from FIG. 5 and comprises the packet header 24 and addressing fields 30, 32 corresponding of to the plain text header and the security information formed from the concatenation of the frame counter, key identifier information and the protection level indication, that is output of the buffer 50. The output of the encryption module 34 appears as the payload 42 and includes the cipher text of the message in and the encrypted authentication tag U obtained from the authentication data, a.

Figure 3:
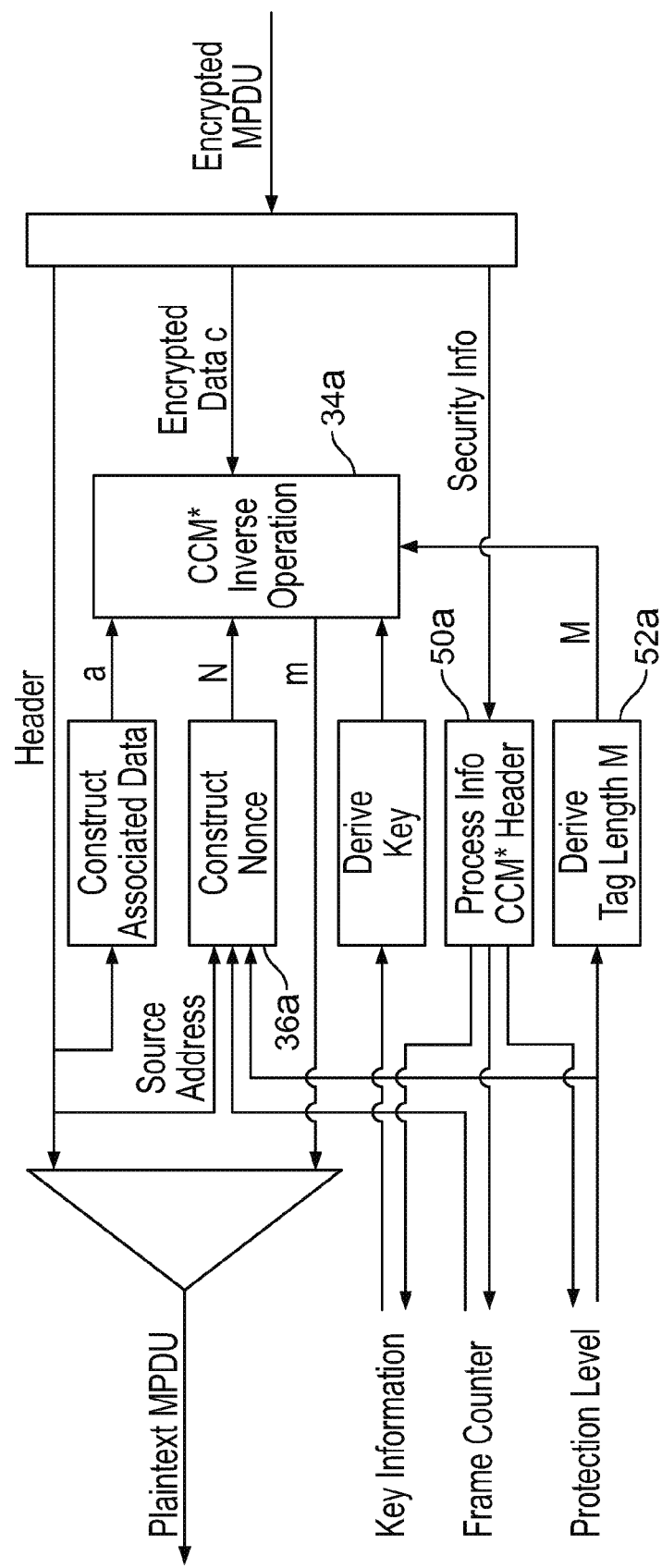
FIG. 3 is a representation similar to FIG. 2 of a cryptographic engine as used by the other of the correspondents.

Upon receipt of the cipher text at the cryptographic unit 20 of correspondent 12, the process is reversed as shown in FIG. 3. The header is processed to remove the associated data and provide an input to the encryption module 34a. The nonce is reconstructed by the construction module 36a from the information in the plane text header and the information derived from the security information. The security information is processed through buffer 50a which extracts the frame counter and derives the protection level included in the security information header. From the protection level, the tag length is derived at module 52a and provided as an input to the encryption module 34a. The encryption module 34a may then perform the decryption and extract the plain text of the message m.

As noted above, the input to the encryption module 34 includes the key, the nonce 36, and the message m to be encrypted and additional authentication data a. The binary string representing the tag length M is also provided as an input. The first step of the encryption module is to compute an authentication field T. In the case of a block cipher implementing the CCM protocol, this is done using the CBC-MAC mechanism and truncating the output to the appropriate size. To perform this operation, a series of blocks $B_o, B_1, \ldots B_n$ are defined and the CBC-MAC operation applied to these blocks.

The first block $B_o$ is formatted as shown in FIG. 8 and has a first octet to contain a set of flags followed by nonce 36, a security field indication of the form indicated in FIG. 7 and an indication of the length of the message m. The flag field is itself formatted as shown in FIG. 9 and includes a first field set of bits that indicate the number of octets in the length field of the message and the authentication length M, i.e. number of octets in the authentication field, corresponding to the tag length derived from the module 52. A further bit indicated as the A data is used to indicate whether or not authentication is included in the operation. Where authentication data is included, the blocks encoding the authentication Adata are formed by right concatenating the octet string that encodes 1(a) with a itself and splitting the result into 16 octet blocks. The last block may be right padded with zeros if necessary. These blocks are appended to the first block $B_o$. After the additional authentication blocks, if any, have been added to the first block B, the message blocks are right concatenated. The message blocks are formed by splitting the message into 16 octet blocks, right padding the last block with zeros if necessary. If the message m is an empty string, then no blocks are added in this step. As a result, a sequence of 16 octet blocks $B_o, B_1 \ldots B_n$ is prepared.

The CBC-MAC is now computed as follows:

$$X_1 := E(K, B_0);$$

$$X_{i+1} := E(K, X_i \oplus B_i) \text{ for } i=1, \ldots, n.$$

where E ( ) is the block cipher function to provide a 16 octet string. An authentication tag T is obtained by truncating the 16 octet string to the left most NI octets as indicated in the tag length output from the function 52.

To encrypt the message data, the CTR mode is used and the key stream blocks are defined by $Si = E(k, a_i)$ for $i = O, 1, 2 \ldots$ .. The encryption blocks $A_1$ are formatted as shown in FIG. 10 with the Sec Field being formatted as indicated in FIG. 8. The flag field as shown in FIG. 11 includes a 3 bit representation of the length L of the message. The bits 3, 4, and 5 are each set to 0.

The encrypted message is then prepared by XORing the octets of the message m in order, with the left most octets of the right concatenation of $S_1, S_2, S_3$. The key block $S_o$ is not used to encrypt the message but is used to encrypt the authentication field T previously obtained. The encrypted authentication value U results from XORing the octets of the authentication field T with the left most in octets of the key stream block $S_o$ and is appended to the encrypted message as part of the enciphered payload c.

Upon receipt of the encrypted message, the encryption key K, the nonce 36, the additional authenticated data, a, and the encrypted message c is obtained and decryption starts by recomputing the key stream to recover the message m and the authentication field T. The message and additional authentication data a is then used to recompute the CBC-MAC value and check T. If the T value is not correct, the message is rejected without revealing further information.

The above format of data permits the encryption module to be used without authenticating data. This is simply achieved by setting the flag bit Adata in the authentication block shown in FIG. 9 at 0 to indicate the absence of any authentication data. A bit value of 1 is indicative of the presence of authentication data. A corresponding value of NI indicative of no authentication data is also generated and included in the data to be enciphered. The provision of the protection level encoding and the inclusion of the tag length M within the message generation also permits variable length authentication tags to be utilised within the CCM block cipher mode. As indicated in FIG. 7, the encoding of the protection level not only indicates the nature of the protection, i.e. authentication with or without encryption but also may be used to uniquely identify the tag length associated with the authentication data. Accordingly, as part of the authentication process, the desired tag length can be verified and messages rejected if they are not compliant.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A method, comprising:
    generating a packet containing a Source Address contained in a header and a protection level, key identifier information, and frame counter contained in the security information portion of the packet;
    obtaining a key related to said key identifier information and a message data m;
    obtaining a nonce data N comprising said Source Address, frame counter, and protection level, wherein a value M encoded in the protection level indicates a length of an authentication tag, wherein the protection level inhibits or invokes data confidentiality, and wherein the protection level inhibits or invokes data authenticity; and
    generating, by a block-cipher, an output c based on said key, the message data m, and the nonce data N, wherein the output comprises the authentication tag if the protection level invokes data authenticity, and wherein the output comprises encrypted data if the protection level invokes data confidentiality.

2. The method of claim 1, wherein generating the output comprises encrypting the authentication tag and the message data m if the protection level invokes both data confidentiality and data authenticity.

3. The method of claim 1, wherein the output comprises message data m and the authentication tag if the protection level inhibits data confidentiality and invokes data authenticity, wherein the message data m in the output is unencrypted.

4. The method of claim 1, wherein the authentication tag in the output is unencrypted.

5. The method of claim 1, wherein the output lacks any authentication tag if the protection level inhibits data authenticity.

6. The method of claim 1, wherein the output comprises plain text if the protection level inhibits data confidentiality.

7. The method of claim 1, wherein the authentication tag comprises a variable-length authentication tag.

8. The method of claim 7, wherein the values of M comprise 0, 4, 8, 16.

9. The method of claim 1, wherein if the value M is zero, then data authenticity is disabled.

10. A non-transitory machine-readable medium comprising machine-executable instructions operable when executed to perform operations comprising:
    generating a packet containing a Source Address contained in a header and a protection level, key identifier information, and frame counter contained in the security information portion of the packet;
    obtaining a key related to said key identifier information and a message data m;
    obtaining a nonce data N comprising said Source Address, frame counter, and protection level, wherein a value M encoded in the protection level indicates a length of an authentication tag, wherein the protection level inhibits or invokes data confidentiality, and wherein the protection level inhibits or invokes data authenticity; and
    generating, by a block-cipher, an output c based on said key, the message data m, and the nonce data N, wherein the output comprises the authentication tag if the protection level invokes data authenticity, and wherein the output comprises encrypted data if the protection level invokes data confidentiality.

11. The medium of claim 10, wherein generating the output comprises encrypting the authentication tag and the message data m if the protection level invokes both data confidentiality and data authenticity.

12. The medium of claim 10, wherein the output comprises message data m and the authentication tag if the protection level inhibits data confidentiality and invokes data authenticity, wherein the message data m in the output is unencrypted.

13. The medium of claim 10, wherein the authentication tag in the output is unencrypted.

14. The medium of claim 10, wherein the output lacks any authentication tag if the protection level inhibits data authenticity.

15. The medium of claim 10, wherein the output comprises plain text if the protection level inhibits data confidentiality.

16. The medium of claim 10, wherein the authentication tag comprises a variable-length authentication tag.

17. The medium of claim 16, wherein the values of M comprise 0, 4, 8, 16.

18. The medium of claim 10, wherein if the value M is zero, then data authenticity is disabled.

19. A device, comprising:
    a processor;
    memory, the memory comprising computer-executable instructions that, when executed by the processor, perform operations comprising:
        generating a packet containing a Source Address contained in a header and a protection level, key identifier information, and frame counter contained in the security information portion of the packet;
        obtaining a key related to said key identifier information and a message data m;
        obtaining a nonce data N comprising said Source Address, frame counter, and protection level, wherein a value M encoded in the protection level indicates a length of an authentication tag, wherein the protection level inhibits or invokes data confidentiality, and wherein the protection level inhibits or invokes data authenticity; and
        generating, by a block-cipher, an output c based on said key, the message data m, and the nonce data N, wherein the output comprises the authentication tag if the protection level invokes data authenticity, and wherein the output comprises encrypted data if the protection level invokes data confidentiality.

\* \* \* \* \*